Dec. 26, 1944.  T. B. MONTGOMERY  2,366,148
MOTOR CONTROL SYSTEM
Filed April 18, 1941
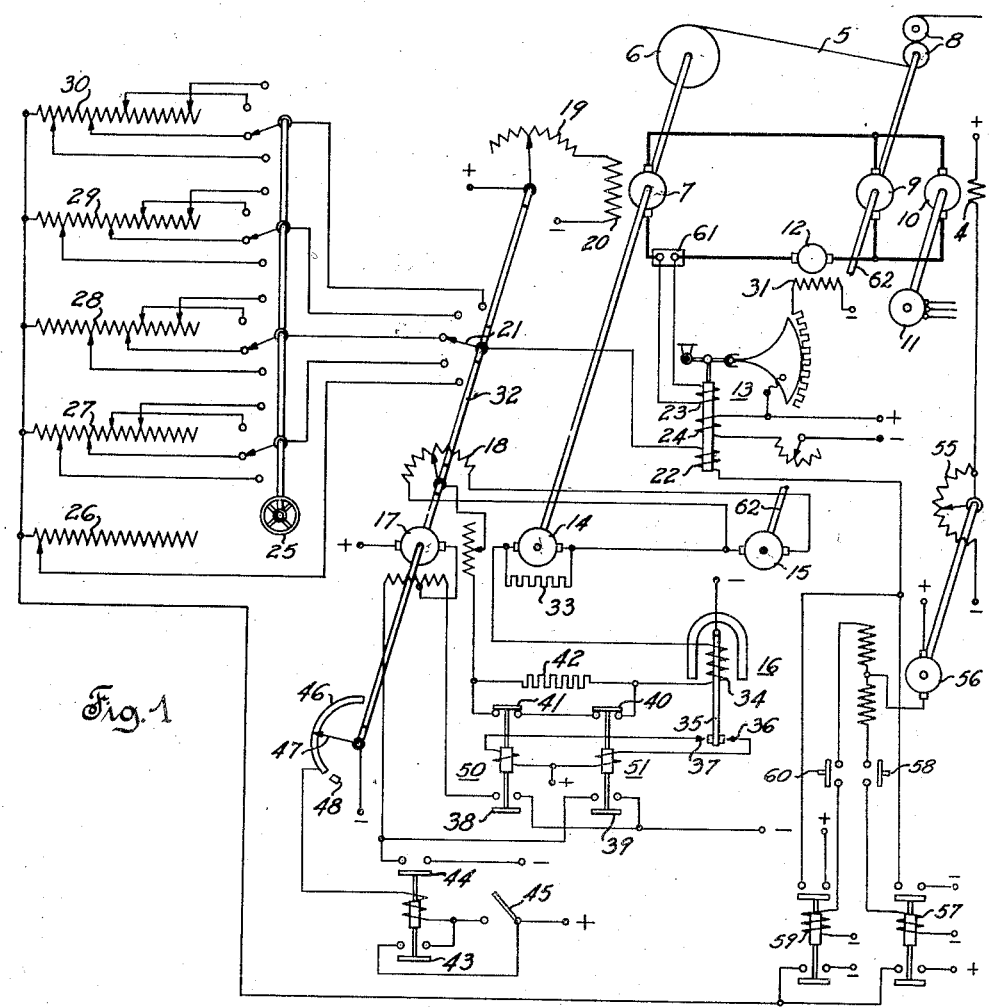
Fig. 1.
Fig. 3.
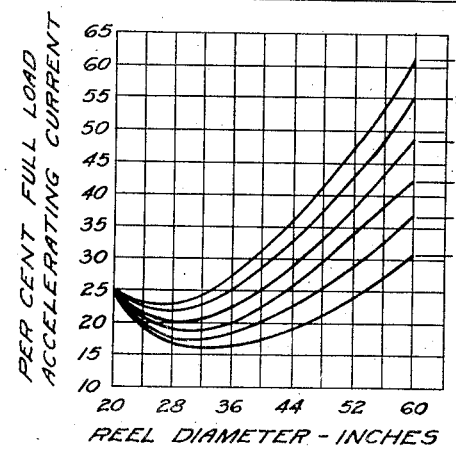
Fig. 2.
Inventor
Terryl B. Montgomery
by Harold A. Silver
Attorney Patented Dec. 26, 1944

2,366,148

UNITED STATES PATENT OFFICE 2,366,148

MOTOR CONTROL SYSTEM

Terryl B. Montgomery, Wauwatosa, Wis., assignor to Allis-Chalmers Manufacturing Company, Milwaukee, Wis., a corporation of Delaware Application April 18, 1941, Serial No. 389,156

13 Claims. (Cl. 242—75)

This invention relates in general to a motor control system and relates particularly to a control system for a motor controlling the tension in a strip of material.

In prior art control systems for tensioning a strip of material being wound on or unwound from a reel, such tension has been controlled by controlling an electrical characteristic of a motor mechanically connected to the strip. In such systems, the electrical characteristic of the motor changes abnormally during periods of acceleration and deceleration and therefore attempts were made to modify or compensate the controlling mechanism during such periods in order to maintain the desired tension.

Inaccuracies in the prior art tensioning systems, during periods of acceleration and deceleration, were occasioned by the fact that the modification or compensation of the controlling mechanism during periods of acceleration and deceleration was made entirely independent of the width of the strip of material being tensioned and entirely independent of the amount of strip material on the reel at the particular time of the acceleration or deceleration. In other words, the compensation during acceleration and deceleration was not truly dependent upon the inertia of the strip material on the reel.

In control systems of the prior art, in which a strip of material is being wound on or unwound from a reel, a tension has been applied to the strip of material by controlling the power output of the reel motor. For constant tension, the power output of the reel motor is maintained at constant value, for a given strip speed, independently of change in the speed of the reel motor due to build-up or build-down of strip material on the reel.

Control of the power output of the reel motor has been obtained by a circuit controller responsive to the differential between voltages of small generators mechanically connected to the roll and reel motors. These prior art control systems did not provide for compensation of the controlling element so that the tension in the strip would be maintained at the desired value during acceleration and deceleration. In these prior art systems, inaccuracies in the tension would result from difference in saturation curves of the reference voltage generators. Further, in the prior art systems where reference voltage machines were small direct current generators, inaccuracies would occur due to the fact that these machines were running under no load conditions and a high resistance film would build up on the commutators thereof, the resistance of which would vary greatly under no load conditions, thereby giving an incorrect reference voltage.

It is therefore an object of the present invention to provide a control system of the above type which will avoid any or all of the above disadvantages.

It is also an object of the present invention to provide a control system for a motor utilized in tensioning a strip of material, in which the modification or compensation of the control mechanism during periods of acceleration or deceleration of the motor is corrected either in accordance with the width of the particular strip being tensioned or in accordance with the amount of such strip wound upon the reel at the particular time of the acceleration or deceleration or in accordance with both such conditions.

It is also an object of the present invention to provide a strip tensioning control system utilizing small direct current generators in which inaccuracies occasioned by differing saturation curves of the generators and by the no load characteristics thereof are avoided.

Objects and advantages other than those above set forth will be apparent from the following description when read in connection with the accompanying drawing, in which:

Fig. 1 is a schematic diagram of connections of a control system embodying the present invention;

Fig. 2 is a showing of curves usable in determining the values of the resistances utilized for inertia compensation in the control system shown in Fig. 1; and Fig. 3 illustrates a modified form of a part of the control system shown in Fig. 1.

In general the tension control system shown in the drawing includes two motors 7 and 9 energized from a generator 10, the voltage of which may be varied by the rheostat 55 to vary the speed of a strip 5. A booster generator 12 in circuit with the reel motor 7 is regulated to maintain the current in the reel motor circuit at a constant value. The field 20 of the reel motor 7 is varied to maintain the power delivered by motor 7 to the reel 6 in accordance with a predetermined sequence of values, thereby maintaining the desired tension on the strip 5. Normally, that is, at a constant speed of the strip 5, the value of the power transmitted between reel 6 and the machine 7 is constant.

The booster regulator 13 is compensated during periods of acceleration and deceleration of the reel motor 7 to add to or subtract from the current in the reel motor 7 in order to maintain the desired strip tension during such acceleration and deceleration. This compensation is effected by a coil 22 on the regulator 13, the effect of which is added to or subtracted from that of the regulator main coil 23, only during periods of acceleration or deceleration, by relays 57 or 59. One or the other of these relays is energized by closure of switch 58 or switch 50 which at the same time causes energization of the motor 58 of the main mill speed rheostat 56. A change in effective resistance of rheostat 56 varies the energization of field 4 which varies the voltage of the generator 10 to vary the speed of the mill.

The amount of compensation provided by the coil 22 depends upon its energization. Coil 22 is connected through a predetermined part of one of a bank of resistances 26 to 30, variously included in circuit with coil 22. Determination of the particular resistance used at any time is controlled by the rheostat 21 in accordance with the amount of material wound on the reel 6. Determination of the particular part of such resistance is controlled by the setting of rheostat 25 in accordance with the width of the strip 5.

Specifically, the strip of material 5 is shown as being wound or unwound from a reel 6 and passing around rolls 8, which may perform a reducing, finishing, tensioning or similar operation on the strip. The motors 7 and 9 are energized from a generator 10 which is shown as driven by an alternating current motor 11. A booster generator 12 is connected in the armature circuit of the reel motor 7 and the booster field 31 is controlled by an electro-responsive regulator shown generally at 13.

The regulator 13 has a main coil 23 which is energized from a shunt 61 (which may be the interpole winding of motor 7) in the armature circuit of motor 7 and which controls the field 31 of the booster 12 so as to maintain the current in the armature of the motor 7 at a constant value. In order to maintain a constant tension on the strip 5, the field 20 of the motor 7 is controlled in accordance with the relative change in speeds of the machine 7 and the machine 9, which relative speed change is a measure of reel diameter change.

If, for example, the strip material 5 is being wound on the reel 6, the speed of motor 7 must decrease with reel build-up in order to maintain a constant tension on the strip 5. The field 20 of the machine 7 is controlled by means of the difference in reference voltages of two tachometer generators 14 and 15 mechanically connected to the reel motor 7 and the roll motor 9, respectively. These tachometer generators 14 and 15 are provided with constant excitation, such as permanent magnets (not shown) and the voltages thereof measure the speeds of motors 7 and 9. A portion (which may be no voltage) of the voltage across generator 15 is connected in opposed series relation with the voltage of generator 14 and in series with the coil 34 of a polarized relay shown generally at 16. The polarized relay 16 when operated energizes a "raise" relay 50 or a "lower" relay 51 which in turn controls a motor 17 operating a set of rheostats 18, 19 and 21.

Resistance 42 is utilized to reduce the current in coil 34 when the armature 35 has closed with contact 36 or 37. Resistance 42 is normally shunted by a circuit including back contacts 40 and 41 of relays 51 and 50, which open upon energization of these relays. This reduction of energization permits armature 35 of relay 16 to drop back to neutral position upon little further reduction of the current in coil 34, although the air gap of relay 16 may have been reduced upon picking up of the armature.

Operation of the motor operated rheostat provides three distinct results. The operation of motor 17 first results in the varying of the amount of resistance 19 in circuit with the field 20 of machine 7, thereby changing the excitation of motor 7 to maintain the voltage constant although the speed is changed, thereby maintaining a constant power output and a constant tension on the strip 5. The second result of the operation of the motor 17 is the variation of the setting of arm 21 thereby connecting one of five resistances 26, 27, 28, 29 or 30 in series with the inertia compensation coil 22 of the regulator 13. This provides for varying the amount of available inertia compensation dependent upon the amount of material on the reel 6. The third result of operation of the motor 17 is the variation of that part of resistance 18, shunted across the tachometer generator 15, which is in circuit with the tachometer generator 14 and the coil 34 of the polarized relay 16. This action changes the amount of reference voltage of the machine 15 so that a new balance of the relay 34 is obtained at the changed speed of motor 7.

For example, it may be considered that the strip material 5 is being wound on the reel 6 and that the reel is about half full of material. As the material is built up on the reel, the tension in the strip 5 increases momentarily which momentarily decreases the speed of motor 7 and therefore the voltage of the tachometer generator 14. This decrease in the voltage of generator 14 relative to the voltage of generator 15 permits a current to flow through the coil 34 of the polarized relay 16 in such direction as to move its armature 35 to close contact 36. Closing of contact 36 energizes relay 51 which closes its contact 39 to run the motor 17 in a clockwise direction as viewed in the drawing.

If the strip tension had decreased and hence the voltage of generator 14 had increased relative to the voltage of generator 15, armature 35 would have closed with contact 37, thereby energizing relay 50 to close contact 38 and run the motor 17 in a counterclockwise direction as viewed in the drawing.

Rotation of motor 17 in a clockwise direction decreases the amount of resistance in circuit with the field 20 of motor 7, thereby increasing the excitation of motor 7 until the voltage of the machine 14 is such that the desired tension is again obtained in the strip 5. This same movement of the motor 17 changes the setting of the potentiometer resistance 18 thereby obtaining the new reference voltage value corresponding to the new speed setting at which the voltages of 14 and 15 will balance. At the same time a new setting of the arm 21 is obtained by which the amount of power available for correct compensation of the regulator 13 upon acceleration or deceleration is obtained.

By varying the potentiometer connection of the rheostat 18 to obtain a new balance after a speed change, a distinct advantage is obtained over prior art systems in which such new balance was obtained by varying the field of the generator 15. No inaccuracies due to difference in saturation curves of machines 14, 15 are introduced due to the use of this potentiometer connection. A change in field strength of only one machine would involve operation of machines 14 and 15 at different points on their saturation curves even if such curves were identical.

The resistances 33 and 18 across the machines 14 and 15 maintain a current load thereon at all times. This loading of machines 14 and 15 provides an advantage over prior art systems where, due to a balance of their voltages in opposed relation, the reference generators operated at practically no load conditions. Under such conditions, a high resistance film builds up on the commutators of these machines, which resistance fluctuates greatly. In these prior art systems, no current flows through the commutator when the generators are balanced and only a very small current when the generators are unbalanced sufficiently to initiate a regulating change. These very small currents are greatly affected by the resistance fluctuations and hence cause considerable regulating inaccuracy. The inaccuracies in tension control resulting from such fluctuations are avoided in the present invention by having an appreciable load current flow through machines 14 and 15 at all times.

As the ratio of reel diameter to reel speed at any constant strip speed is not a linear function and as the ratio of terminal volts of generator 14 to reel speed is a linear function, one of the resistances 18 or 19 must be stepped non-linearly in order to have the position of the motor operated rheostat shaft 32 a measure of reel diameter. This can be effected by stepping resistance 19 in equal R. P. M. per step and stepping resistance 18 in steps in accordance with the speed-reel diameter curve of generator 14. This can also be effected by stepping resistance 19 in steps in accordance with the reel diameter-reel speed curve and stepping resistance 18 in equal volts per step.

It will be noted, assuming that the strip 5 is being wound on the reel 6, that the speed of motor 7 must decrease in proportion to the change in reel diameter of the reeled material in order to maintain the desired tension. This means, in effect, that the rotation of the shaft 32 operated by the motor 17 will be in proportion to the change in reel diameter and therefore the position of shaft 32 is a measure of the reel diameter. The function of the rheostat 21 is therefore to modify the control effected by the regulator 13 in accordance with the actual diameter of reeled material 5. This provides that the compensation of the regulator 13 during acceleration or deceleration is further modified dependent upon the amount of strip material 5 on the reel 6 at the time of such acceleration or deceleration.

Although shown in connection with this particular tensioning control system, this compensation feature is applicable to any control system utilizing inertia compensation and provided with an element measuring reel diameter change. In the particular control system shown and described, reference has been made to "the desired tension." This tension may be maintained at a constant value or may be progressively increased or decreased or may have any predetermined sequence of values. The desired tension may be obtained in various ways by controlling the power transmitted between the reel 6 and the dynamo-electric machine 7. Broadly, this is done by maintaining one or more of the various characteristics of operation, such as current, voltage, torque, speed and the like, in accordance with predetermined sequences of values.

The positions of the tap points on the resistors 26 to 30 are determined by means of curves such as shown in Fig. 2. These curves are plotted from actual design figures of the specific mill on which this control system is to be used and show the percentage full load accelerating current necessary to accelerate or decelerate the mill at various reel diameters (amount of strip material on the reel 6) for various widths of the strip 5.

For example, the left hand taps of the five resistors 26 to 30 correspond to points on the lowest curve of Fig. 2. Thus, if the hand wheel 25 is set so that each rheostat arm is in the lowermost position shown, the compensation available is that designed for the narrowest strip to be run. If a wider strip is to be rolled, the hand wheel 25 is set in the position shown in the drawing. If a still wider strip is to be rolled, the hand wheel is rotated in a clockwise direction and set at the proper setting for such strip width. The number of settings is determined by the number of widths to be rolled. The setting of this hand wheel is made prior to the rolling of the strip and only one setting is necessary for the entire rolling at that strip width.

The setting of the hand wheel 25 in accordance with the strip width may be effected automatically in any suitable manner, for example, as by means of photoelectric relays operated by interception of a light beam by the strip.

The need for variation in the amount of acceleration and deceleration compensation, in order to accurately maintain the desired tension, is evident when the variation of the factors affecting the inertia of the reel is considered. In a strip mill the "full" reels of strip, with which the mill is put into operation, do not always have the same amount of strip on them. Therefore, the mill always starts with an empty delivery reel but the entry reel may have varying amounts of strip thereon and therefore have a varying inertia. When decelerating at the end of the pass, the entry reel is always empty but the delivery reel may have varying amounts of strip thereon.

A strip rolling mill may at times be accelerated and decelerated other than at the beginning and end of the pass. For example, when coils are "sticky" or have cracked edges, the operator usually decelerates the mill to a comparative low speed, usually about fifty percent of full speed, until the bad sections are rolled and then again accelerates the mill to full speed. Obviously, for a control system to accurately supply the compensation necessary for acceleration or deceleration, a measure of the varying values of the reel inertia must be had.

When the material is all reeled onto the reel 6 and the reel 6 is removed from the mill, a switch 45 is actuated to closed position. The means for operating this switch 45 by removal of the reel 6 is not shown in the schematic diagram, but may be by any suitable means such as the coil stripper, which usually includes a hydraulic piston utilized to push the coil of strip material off the reel. Closure of this switch 45 energizes a limit relay which closes its sealing contacts 43 and also closes its contacts 44 which energize the motor 17 to run it back to its previous position. A limit switch 46, 47, 48 interrupts the circuit to the limit relay when the rheostat 17 is returned to its beginning position.

The specific showing in the drawing of the polarized relay 16 in series with the generator 14 and a variable part of resistor 18 is the preferred embodiment. Broadly, it is necessary to have the relay 16 responsive to the difference between the voltages of the generators 14 and 15, one of which voltages is modified in accordance with reel diameter change. Either of the two voltages may be so modified. Such modification of the voltage of generator 15 will decrease its effective voltage in accordance with reel build-up. Such modification of the effective voltage of generator 14 will increase its effective voltage in accordance with the reel build-up.

As shown in Fig. 3, a double coil relay 16' may be similarly utilized to control contacts 36 and 37. This relay 16' has opposed coils 63 and 64 which when equally energized maintain the armature 35 in the neutral position shown. Coil 64 measures the voltage of generator 14 and coil 63 measures the effective voltage of generator 15 as modified by a variable resistance 18' controlled by the shaft 32 of the motor operated rheostat 17. The operation of contacts 36 and 37 relative to the difference between the voltages of the generators 14 and 15 is similar to their operation in the embodiment shown in Fig. 1.

Any reelable material, such as steel strip, wire, metal foil, textiles, paper or similar material, may be tensioned by the control system of this invention.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In combination, a dynamo-electric machine, a device subject to variations in its moment of inertia, a power transmitting connection between said device and said dynamo-electric machine, means for normally maintaining the power transmitted between said dynamo-electric machine and said device at a substantially constant value, means for changing said value of transmitted power during a period of acceleration or deceleration, and means including an electroresponsive device for predetermining said change in said value in accordance with variations in the moment of inertia of said device.

2. In combination, a dynamo-electric machine, a reel for strip material, a power transmitting connection between said reel and said dynamo-electric machine, means for normally maintaining the power transmitted between said dynamo-electric machine and said reel at a substantially constant value, means for changing said value of transmitted power during a period of acceleration or deceleration, and means including an electroresponsive device for predetermining said change in said value in accordance with the amount of said strip material on said reel.

3. In combination, a dynamo-electric machine, a reel for strip material, a power transmitting connection between said reel and said dynamo-electric machine, means for normally maintaining the power transmitted between said dynamo-electric machine and said reel at a substantially constant value, means for changing said value of transmitted power during a period of acceleration or deceleration, and means including an electroresponsive device for predetermining said change in said value in accordance with the width of said strip material.

4. In combination, a dynamo-electric machine, a reel for strip material, a power transmitting connection between said reel and said dynamo-electric machine, means for normally maintaining the power transmitted between said dynamo-electric machine and said reel at a substantially constant value, means for changing said value of transmitted power during a period of acceleration or deceleration, and means including an electroresponsive device for predetermining said change in said value in accordance with the reel diameter of said strip material on said reel.

5. In a control system, a dynamo-electric machine, a material carrying reel, a power transmitting connection between said reel and said dynamo-electric machine, means for performing an operation on said material, and means for controlling said dynamo-electric machine to maintain a predetermined tension on said material while being wound upon or unwound from said reel, said controlling means comprising a first constant excitation generator connected to said dynamo-electric machine so that the voltage of said first generator varies in accordance with the speed of said dynamo-electric machine, said controlling means further comprising a second constant excitation generator connected to said operation performing means so that the voltage of said second generator varies in accordance with the speed of said operation performing means, and said controlling means further comprising means selectively controlling said dynamo-electric machine in response to the direction of a difference of the voltages of said generators.

6. In a control system, a dynamo-electric machine, a material carrying reel, a power transmitting connection between said reel and said dynamo-electric machine, means for performing an operation on said material, means for controlling said dynamo-electric machine to maintain a predetermined tension on said material while being wound upon or unwound from said reel, said controlling means comprising a first generator connected to said dynamo-electric machine so that the voltage of said first generator varies in accordance with the speed of said dynamo-electric machine, said controlling means further comprising a second generator connected to said operation performing means so that the voltage of said second generator varies in accordance with the speed of said operation performing means, said controlling means further comprising means responsive to a difference of the voltages of said generators, and means providing said generators with a substantial load current when said voltages thereof are substantially equal.

7. In a control system, a dynamo-electric machine, a material carrying reel, a power transmitting connection between said reel and said dynamo-electric machine, means for performing an operation on said material while being wound upon or unwound from said reel, a first generator connected to said dynamo-electric machine so that the voltage of said first generator varies in accordance with the speed of said dynamo-electric machine, a second generator connected to said operation performing means so that the voltage of said second generator varies in accordance with the speed of said operation performing means, resistance means connected so that the voltage thereacross varies in accordance with the voltage of one only of said generators, a tapped connection provided on said resistance means whereby a variable part of the total voltage thereacross is made available, an electroresponsive device operatively responsive to the difference between said variable part of the total voltage across said resistance means and the voltage of the other of said generators, and means operative in response to operation of said electroresponsive device for controlling the energization of said dynamo-electric machine and for varying said tapped connection.

8. In a control system, a dynamo-electric machine, a material carrying reel, a power transmitting connection between said reel and said dynamo-electric machine, means for performing an operation on said material while being wound upon or unwound from said reel, a first generator connected to said dynamo-electric machine so that the voltage of said first generator varies in accordance with the speed of said dynamo-electric machine, a second generator connected to said operation performing means so that the voltage of said second generator varies in accordance with the speed of said operation performing means, resistance means connected so that the voltage thereacross varies in accordance with the voltage of one only of said generators, a tapped connection provided on said resistance means whereby a variable part of the total voltage thereacross is made available, an electroresponsive device operatively responsive to the difference between said variable part of the total voltage across said resistance means and the voltage of the other of said generators, means including an electro-responsive element for varying the energization of said dynamo-electric machine during acceleration and deceleration of said reel, and means operative in response to operation of said electroresponsive device for controlling the energization of said dynamo-electric machine, for varying said tapped connection, and for varying the operative effect of said electroresponsive element.

9. In a control system, a dynamo-electric machine, a reel carrying strip material, a power transmitting connection between said reel and said dynamo-electric machine, means for performing an operation on said strip, means for controlling said dynamo-electric machine for normally maintaining the power transmitted between said dynamo-electric machine and said reel at a substantially constant value to thereby maintain a predetermined tension on said material between said reel and said operation performing means, means for changing said value of transmitted power during a period of acceleration or deceleration to thereby maintain said predetermined tension on said material, and means including an electroresponsive device for predetermining said change in said value in accordance with variations in the moment of inertia of said reel and said material thereon.

10. In a control system, a dynamo-electric machine, a reel carrying strip material, a power transmitting connection between said reel and said dynamo-electric machine, means including a current regulator for controlling said dynamo-electric machine for maintaining the power transmitted between said dynamo-electric machine and said reel at a substantially constant value at constant strip speed, means for changing the speed of said strip, means comprising a biasing means for said current regulator for changing said value of transmitted power during said speed changing, and means including an electroresponsive device for predetermining said regulator bias in accordance with the moment of inertia of said reel and the strip material thereon.

11. In a control system, a dynamo-electric machine, a reel carrying strip material, a power transmitting connection between said reel and said dynamo-electric machine, means including a current regulator for controlling said dynamo-electric machine for maintaining the power transmitted between said dynamo-electric machine and said reel at a substantially constant value at constant strip speed, means for changing the speed of said strip, means comprising a biasing means for said current regulator for changing said value of transmitted power during said speed changing, and means comprising a resistor the value of which is preset in accordance with the width and reel diameter of said reeled material for predetermining said regulator bias.

12. In a control system, a dynamo-electric machine, a material carrying reel, a power transmitting connection between said reel and said dynamo-electric machine, means for performing an operation on said material, means for maintaining a constant tension in said material between said reel and said operation performing means, for any predetermined speed of said operation performing means, said tension maintaining means comprising means for maintaining the armature current in said dynamo-electric machine at a constant value except during acceleration and deceleration of said dynamo-electric machine, said tension maintaining means further comprising means for modifying said current controlling means to vary said armature current during acceleration and deceleration of said dynamo-electric machine, and said tension maintaining means further comprising means operative in accordance with a change in reel diameter of said material for controlling the excitation of said dynamo-electric machine and for varying the operative effect of said modifying means.

13. In a control system, a dynamo-electric machine, a material carrying reel, a power transmitting connection between said reel and said dynamo-electric machine, means for performing an operation on said material, means for maintaining a predetermined tension in said material between said reel and said operation performing means, for any predetermined speed of said operation performing means, said tension maintaining means comprising means for maintaining the armature current in said dynamo-electric machine at predetermined values except during acceleration and deceleration of said dynamo-electric machine, said tension maintaining means further comprising means for modifying said current controlling means to vary said values of armature current during acceleration and deceleration of said dynamo-electric machine, and said tension maintaining means further comprising means operative in accordance with a change in reel diameter of said material for controlling the energization of said dynamo-electric machine and for varying the operative effect of said modifying means.

TERRYL B. MONTGOMERY.